(12) United States Patent
Di Gregorio

(10) Patent No.: US 7,793,296 B2
(45) Date of Patent: Sep. 7, 2010

(54) SYSTEM AND METHOD FOR SCHEDULING A MULTI-THREADED PROCESSOR

(75) Inventor: Lorenzo Di Gregorio, Pescara (IT)

(73) Assignee: Infineon Technologies AG, Munich (DE)

( * ) Notice: Subject to any disclaimer, the term of this patent is extended or adjusted under 35 U.S.C. 154(b) by 1296 days.

(21) Appl. No.: 11/305,336

(22) Filed: Dec. 19, 2005

(65) Prior Publication Data

US 2006/0161924 A1 Jul. 20, 2006

(30) Foreign Application Priority Data

Dec. 20, 2004 (DE) .................. 10 2004 061 339

(51) Int. Cl.
*G06F 9/46* (2006.01)
*G06F 7/38* (2006.01)
*G06F 13/26* (2006.01)

(52) U.S. Cl. .................. 718/103; 718/108; 708/290; 710/265

(58) Field of Classification Search .......... 718/103, 718/108; 708/290; 710/265
See application file for complete search history.

(56) References Cited

U.S. PATENT DOCUMENTS

| 6,061,709 | A | 5/2000 | Bronte | |
|---|---|---|---|---|
| 2007/0198971 | A1* | 8/2007 | Dasu et al. | ........... 717/140 |

OTHER PUBLICATIONS

Kuacharoen, P.; Shalan, M; Mooney III, V.; "A configurable hardware scheduler for real-time systems"; Proceedings of the International Conference on Engineering of Reconfigurable Systems and Algorithms, pp. 96-101, Jun. 2003.*

Noguera, J.; Badia, R; "Dynamic run-time HW/SW scheduling techniques for reconfigurable architectures"; Proceedings of the tenth international symposium on Hardware/software codesign table of contents, Session: System design methods: scheduling advances table of contents; pp. 205-210; Year of Publication: 2002.*

Aydin, H.; Melhem, R.; Mosse, D.; Mejfa-Alvarez, P.; "Optimal reward-based scheduling of periodic real-time tasks"; Real-Time Systems Symposium, 1999. Proceedings. The 20th IEEE; Dec. 1-3, 1999 pp. 79-89.*

Yang, L.; Yuan, J.; "A Single-Stage Direct Interpolation Multiphase Clock Generator with Phase Error Averaging"; Analog Integrated Circuits and Signal Processing archive; vol. 38 , Issue 1 (Jan. 2004); pp. 17-26; Year of Publication: 2004; ISSN:0925-1030.*

(Continued)

*Primary Examiner*—Meng-Ai An
*Assistant Examiner*—Nikhil Krishnan
(74) *Attorney, Agent, or Firm*—Slater & Matsil, L.L.P.

(57) ABSTRACT

The invention relates to a device to be used with a scheduling method, and to a scheduling method, in particular a context scheduling method, comprising the steps of performing a scheduling for threads to be executed by a multithreaded processor, wherein the scheduling is performed as a function of index variables assigned to the threads. That thread whose index variable has the highest, or—in an alternative—the lowest value may be selected as the respective thread to be executed by the processor.

20 Claims, 3 Drawing Sheets

OTHER PUBLICATIONS

Hildebrandt, J.; Timmermann, D.; "An FPGA Based Scheduling Coprocessor for Dynamic Priority Scheduling in Hard Real-Time Systems"; R.W. Hartenstein and H. Grünbacher (Eds.): FPL 2000, LNCS 1896, pp. 777-780, 2000.*

Kalogeraki, V.; Melliar-Smith, P.M.; Moser, L.E.; "Dynamic Scheduling of Distributed Method Invocations"; Real-Time Systems Symposium, 2000. Proceedings. The 21st IEEE Nov. 27-30, 2000 pp. 57-66.*

Banks, J. S. et al. (1994). "Switching Costs and the Gittins Index," *Econometrica* 62(3):687-694.

Bertsekas, D. P. (1995). "Stochastic Scheduling and the Multiarmed Bandit," Chapter 1 *In Dynamic Programming and Optimal Control*. Volume Two, pp. 54-65, *Athena Scientific* ISBN 1-886529-13-2.

Gittins, J. C. (1979). "Bandit Processes and Dynamic Allocation Indices," *Journal of the Royal Statistical Society* Series B, 41(2):148-177.

Gittins, J. C. et al. (1974). "A Dynamic Allocation Index for the Sequential Allocation of Experiments," *In Progress in Statistics*. J. Gani et al. Eds., North-Holland: Amsterdam, pp. 241-266.

Kuacharoen, P. et al. (2006). "A Configurable Hardware Scheduler for Real-time Systems," Center for Research on Embedded Systems and Technology, School of Electrical and Computer Engineering, Georgia Institute of Technology: Atlanta, pp. 1-7. Located at <http://www.ece.gatech.edu/research/codesign/publications/pramote/paper/chs-ERSA03.pdf>.

Mickova, J. (2000). "Stochastic Scheduling with Multi Armed Bandits," MSEE Master Thesis, Department of Electrical and Electronic Engineering, University of Melbourne, Australia.

Puterman, M. L. (1994). "Markov Decision Processes—Discrete Stochastic Dynamic Programming," Wiley Series in Probability and Mathematical Statistics, John Wiley & Sons. Inc., pp. 348-371, ISBN 0-471-61977-9.

Sundaram, R. K. (2003). "Generalized Bandit Problems," Department of Finance, Stern School of Business, New York University: New York, pp. 1-30. Located at <http://pages.stern.nyu.edu/~rsundara/pdf/Bandits.pdf>.

Weber, R. R. et al. (1990). "On an Index Policy for Restless Bandits," *Journal of Applied Probability* 27:637-648.

Whittle, P. (1980). "Multi-armed Bandits and the Gittins Index," *Journal of the Royal Statistical Society* Series B, 42(2):143-149.

Whittle, P. (1982). "Sequential Scheduling and the Multi-armed Bandit," Chapter 14 *In Optimization over Time—Dynamic Programming and Stechastic Control*. vol. 1, John Wiley and Sons Ltd, pp. 210-219.

Whittle, P. (1988). "Restless Bandits: Activity Allocation in a Changing World," *Journal of Applied Probability* 25A:297-298.

* cited by examiner

SYSTEM AND METHOD FOR SCHEDULING A MULTI-THREADED PROCESSOR

CLAIM FOR PRIORITY

This application claims the benefit of priority to German Application No. 10 2004 061 339.7, filed in the German language on Dec. 20, 2004, the contents of which are hereby incorporated by reference.

TECHNICAL FIELD OF THE INVENTION

The invention relates to a scheduling method, in particular a context scheduling method, and to a device to be used with a scheduling method.

BACKGROUND OF THE INVENTION

Conventional digital computing circuits (e.g. corresponding microcontroller or microprocessor systems arranged on a microchip) comprise one or a plurality of (central) control or processing units (Central Processing Units (CPUs), or CPU "cores").

The CPU or the CPUs are—via a system bus (and possibly one or a plurality of further bus systems)—connected with one or a plurality of (external or internal) memories, e.g. a program and a data memory ("program memory" and "data memory").

The "program memory" comprises in particular the sequence of the commands to be processed by the CPU core(s), i.e. the program (and possibly additionally corresponding data constants to be used by the CPU core(s)).

The program memory may, for instance, be an EPROM (Erasable PROM) or an EEPROM (Electrically Erasable PROM), in particular a flash EEPROM device.

Thus, it can be achieved that the program remains stored on the corresponding memory even if the current supply is interrupted.

For programs that are to be changed frequently, RAMs (RAM=Random Access Memory or read-write memory), in particular DRAMs, may, for instance, also be—alternatively—used as program memories that are adapted to be loaded from an external mass storage.

In the above-mentioned "data memory", the variables which are possibly to be modified in particular by the CPU core(s) during the execution of the program may be stored.

The data memory may, for instance, be composed of one or a plurality of RAM devices, in particular e.g. an appropriate DRAM device (DRAM=Dynamic Random Access Memory) or SRAM device (SRAM=Static Random Access Memory).

A software program (or several such programs) to be processed by the CPU core may be subdivided into a plurality of appropriate software tasks (threads).

This has, for instance, the advantage that—in particular e.g. in the case of so-called multithreaded (MT) microcontroller or microprocessor systems—a plurality of different threads each may be loaded competitively into one and the same CPU core and be processed there.

By means of multithreaded (MT) microcontroller or microprocessor systems, particular resources—in particular e.g. the execution pipeline (processing pipeline)—can be utilized more efficiently.

Clock times in which there is a delay in a particular thread loaded into the CPU core for certain reasons, may be used for processing a further thread also loaded into the CPU core.

For storing the status or "context", respectively, of—possibly a plurality of—threads loaded into the CPU core, elements such as program counter (PC), execution status register, register file, etc., etc. are possibly present several times over in a multithreaded (MT) microcontroller or microprocessor system.

Thus, a plurality of different threads can be kept simultaneously in one and the same CPU core, and appropriate switching between the threads can be performed.

Usually, only a small portion of the respective threads to be executed is kept simultaneously in the CPU core; the remaining threads to be executed are latched outside the CPU core until they are loaded into the CPU core.

The scheduling of the threads thus takes place in two steps: In a first scheduling step it is decided when which threads (that are latched outside the CPU core and) that are scheduled for execution are loaded into the CPU core and are assigned to a corresponding "context" ("off-core thread scheduling" or "thread scheduling"). In a second subordinated step it is decided when which of the threads that have been loaded into the CPU core and have been assigned to a context has to be executed ("on-core thread scheduling" or "context scheduling").

In the case of conventional multithreaded (MT) microcontroller or microprocessor systems, the "context scheduling" is usually controlled by hardware and the "thread scheduling" by software.

For both scheduling steps, respectively different scheduling strategies may be used. Generally speaking, the object of the "context scheduling" (and possibly also of the "thread scheduling") is the optimization of a corresponding cost function, in particular e.g. the achieving of a throughput that is as high as possible, the so-called tolerance of corresponding latencies, or a use of the processor resources that is as optimal as possible, respectively, etc., etc., and the object of the "thread scheduling" is e.g. the determination of a conflict-free succession of program flows, or the prioritization of program flows by means of real time requirements, etc.

Conventional context scheduling methods or context scheduling strategies, respectively, are based on ("quasi static) priorities (that are definitely allocated and are assigned to the individual threads to be executed).

A consequence of this is that, as a rule—in the meaning of the above-mentioned and/or corresponding further objects of the respective scheduling (i.e. in the meaning of the optimization of a corresponding cost function)—no optimum context scheduling, or a context scheduling that is relatively far from an optimum scheduling, respectively, is achieved.

SUMMARY OF THE INVENTION

It is an object of the invention to provide a novel scheduling method, in particular a context scheduling method, and a novel device to be used with a scheduling method.

This and further objects are achieved by the subject matters of claims 1 and 11.

Advantageous further developments of the invention are indicated in the subclaims.

In accordance with a first aspect of the invention there is provided a scheduling method, in particular a context scheduling method, comprising the steps of:

performing a scheduling for threads to be executed by a multithreaded (MT) processor, wherein the scheduling is performed as a function of index variables assigned to the threads.

In a particularly advantageous embodiment of the invention that thread is chosen as the thread to be executed by the processor whose index variable has the highest (or—in a further, alternative, advantageous embodiment—the lowest) value.

In a preferred further development of the invention, the value of the index variable of a thread being in the active status can be changed during the active thread status; in particular can the value of the index variable of the respectively executed thread be changed in the course of thread execution.

Advantageously, a hardware circuit, in particular a hardware interpolator circuit, can be used to change the value of the index variable.

In accordance with a further aspect of the invention there is provided a device, in particular a context scheduler, to be used with a scheduling method, wherein a scheduling is performed for threads to be executed by a multithreaded (MT) processor, Wherein the device comprises a device for comparing index variables assigned to the threads.

In an advantageous embodiment, the comparing device is designed and equipped such that it determines the thread whose index variable has the highest (or, alternatively, e.g. the lowest) value.

Advantageously, the device comprises a device for generating a thread change signal (or a context switch indication signal, respectively) if the comparing device determines that a change has been performed with the thread with the highest (or, alternatively: the lowest) index variable value. The execution of the last executed thread then may be interrupted, and the execution of the thread with the (then) highest index variable value may be started instead.

BRIEF DESCRIPTION OF THE DRAWINGS

In the following, the invention will be explained in more detail by means of embodiments and the enclosed drawing. The drawing shows.

DETAILED DESCRIPTION OF THE INVENTION

Figure 1:
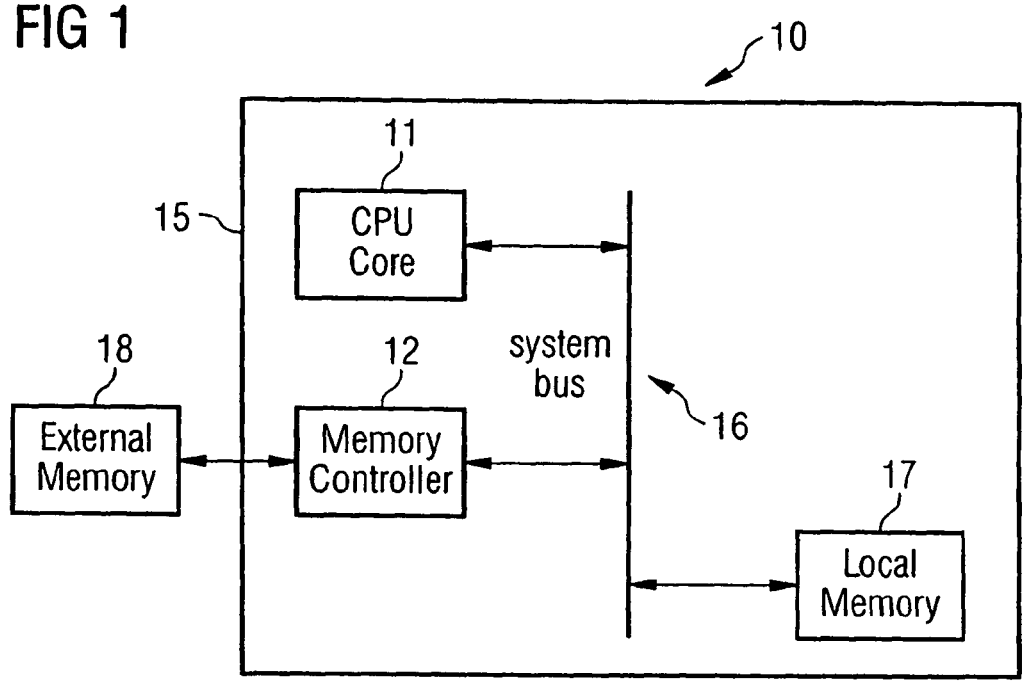
FIG. 1 a schematic, simplified representation of a microcontroller or microprocessor system according to an embodiment of the present invention.

FIG. 1 shows a schematic representation of a microcontroller or microprocessor system 10 according to an embodiment of the invention.

The microcontroller or microprocessor system 10 may, for instance, be an 8 bit microcontroller or microprocessor system 10, or any other microcontroller or microprocessor system, e.g. an appropriate 16 bit, 32 bit, or 64 bit microcontroller or microprocessor system, etc., in particular a multithreaded (MT) microcontroller or microprocessor system, e.g. a microcontroller or microprocessor system based on a "fine grain" multithreaded processor microarchitecture protocol of the company Infineon.

The microcontroller or microprocessor system 10 comprises one or a plurality of (central) control or processing units 11 (Central Processing Units (CPUs) or CPU "cores", respectively) arranged on a corresponding microchip 15.

The CPU 11 is or the CPUs are—via a system bus 16 (and possibly one or a plurality of further bus systems)—connected with one or a plurality of internal memories 17 (provided on the same microchip 15 as the CPU 11), and—e.g. via the system bus 16 and one or a plurality of corresponding memory controllers 12—with one or a plurality of external memories 18 (provided on a different microchip than the CPU 11).

The memories 17, 18 may, for instance, act as "program memory" and/or "data memory".

The "program memory" contains in particular the sequence of the commands to be executed by the CPU(s) 11, i.e. the program (and possibly additional corresponding data constants to be used by the CPU(s) 11).

The program memory—that is e.g. formed by the memory 17—may, for instance, be an EPROM (Erasable PROM) or an EEPROM (Electrically Erasable PROM), in particular a flash EEPROM device.

Thus, it can be achieved that the program remains stored on the corresponding memory even if the current supply is interrupted.

For programs that are to be changed frequently, RAMS (RAM=Random Access Memory or read-write memory), in particular DRAMS, may, for instance, also be—alternatively—used as program memories that are adapted to be loaded from an external mass storage.

In the above-mentioned "data memory"—that is e.g. formed by the memory 18—the variables—which possibly have to be modified in particular by the CPU(s) 11 during the execution of the program—may, for instance, be stored.

The data memory may e.g. be composed of one or a plurality of RAM devices, in particular e.g. by an appropriate DRAM device (DRAM=Dynamic Random Access Memory) or SRAM device (SRAM=Static Random Access Memory).

A software program (or a plurality of such programs)—to be executed by the CPU or the CPU core 11—may be subdivided into a plurality of corresponding software tasks (threads).

This, for instance, has the advantage that—in particular in the case of the multithreaded (MT) microcontroller or microprocessor system 10 illustrated here—a plurality of different tasks each can be loaded simultaneously into the CPU core 11 in parallel and can be processed there.

For storing the status or "context" of—possibly several—threads loaded into the CPU core 11, particular elements such as program counter (PC), execution status register, stack pointer, register file, etc., etc. are possibly present several times with the CPU core 11 (e.g. twice, three times, four times, or five times, etc.).

A set of status elements referred to as thread context is assigned to each thread. By this, and by the multiple providing of the above-mentioned elements, a plurality of different threads (e.g. two, three, four, or five threads, etc.) can be loaded simultaneously into the CPU core 11, and appropriate switching can be performed between the threads (in particular such that only few cycles, or—particularly advantageously—no cycle gets lost during switching.

This way, particular processor resources—in particular e.g. the execution pipeline (processing pipeline)—can be used more efficiently; the execution pipeline is adapted to simultaneously process commands assigned to different threads.

For instance, clock times in which there is a delay in a particular thread loaded into the CPU core 11 for certain reasons, may be used for processing a further thread loaded into the CPU core in parallel.

As will be explained in more detail in the following, only a (small) part of the respective threads to be executed is, as a rule, loaded simultaneously into the CPU core 11; the remaining threads to be executed are latched outside the CPU core 11 until they are loaded into the CPU core 11 (and are, to this end, for instance, read out from the memory 17 and stored—for latching—in a (further) memory provided in the vicinity of the CPU core 11).

The scheduling of the threads is thus performed in two steps: In a first scheduling step it is decided when which threads (that are latched outside the CPU core 11 in the above-mentioned further memory and) that are scheduled for execution are loaded into the CPU core 11 and are assigned to a corresponding "context" ("off-core thread scheduling" or "thread scheduling").

Figure 2:
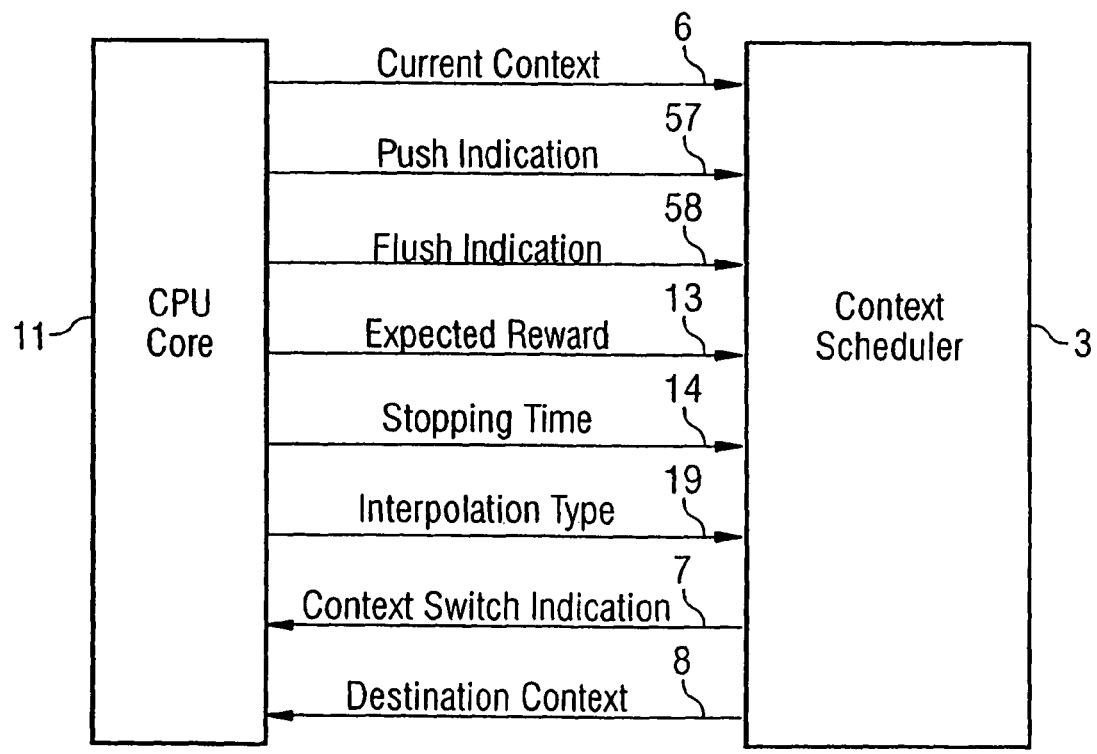
FIG. 2 a schematic representation of the context scheduler used for context scheduling with the microcontroller or microprocessor system illustrated in FIG. 1, and of the CPU illustrated in FIG. 1.

In a second, subordinated step it is decided when which of the threads that have been loaded into the CPU core 11 has to be executed ("on-core thread scheduling" or "context scheduling", e.g. by means of a context scheduler 3 implemented in hardware and illustrated in FIG. 2).

The thread scheduling may, for instance—as conventionally—be controlled by software (or, alternatively, e.g. also by hardware).

The context scheduler 3 responsible for the "on-core thread scheduling" or "context scheduling" needs—for every on-core thread loaded into the CPU core 11—information regarding the current context status, and attribute information (e.g. regarding the thread index value or the default thread index value (or regarding corresponding interpolation type default values and expected reward default values (cf. below))).

This information may be stored in an appropriate context status array memory.

The context status array memory may contain a plurality of context status elements (CSE) each comprising—related to one respective context—the above-mentioned information concerning the current context status and the above-mentioned attribute information.

Each context status element may comprise two registers, namely a first register for storing the context status information, and a second register for storing the attribute information.

The first register comprises at least one bit which indicates whether the respective context status element (or the corresponding context) is "free" or occupied ("not free") (i.e. occupied by a corresponding thread or not) ("occupied" bit).

If, during the above-mentioned thread scheduling, it is determined that a context status element (or the corresponding context) is "free" (i.e. if the "occupied" bit is in a status indicating such a status (e.g. a non-set status), one out of a plurality of candidate threads scheduled for execution and latched in the above-mentioned further memory may (corresponding to the scheduling strategy used with thread scheduling (e.g. corresponding to conventional methods, the respectively first out of a plurality of threads contained in a candidate thread list and being in a ready status)) be loaded into the CPU core 11, the thread may be linked with the corresponding context, and the "occupied" bit may be set then (and e.g. a further status bit characterizing the thread as being in the status "idle" then).

Furthermore, the corresponding attribute information (thread index value or default thread index value (or interpolation type default value and expected reward default value (cf. below))) which is e.g. stored in the above-mentioned program memory 17 with an assignment to the respective thread (and is latched in the above-mentioned further memory during the loading of the thread) may be stored for the newly loaded thread in the context status array memory, in particular in the (second) register of the corresponding context status element, and the starting address of the newly loaded thread may be written into the corresponding program counter (PC) of the CPU core 11.

A thread to be executed by the CPU core 11 may—from an on-core view (i.e. for the context scheduler 3)—in particular be in an active, or a non-active status:

"non active" (e.g. "idle": thread is ready for starting or for continuing the execution, respectively, but is not executed (at the moment))

"active" or "running": thread is executed at the moment in that corresponding commands are possibly fetched and are executed by the execution pipeline or the processing pipeline.

In the CPU core 11, only one single thread each can be in the status "running".

The status of the above-mentioned "idle" bit that is stored in the context status array memory is queried by the context scheduler 3. The context scheduler 3 selects—if a context or thread being in execution by the CPU core 11, i.e. in the status "running", is to be replaced by a new thread to be executed (or a new thread is to be taken to a status "running", respectively)—the next, running context or thread, or the next context or thread to be executed by the CPU core 11 (i.e. to be taken to a status "running"), respectively, among those contexts or threads that are characterized as being in the status "idle" by an "idle" bit set.

As is shown in FIG. 2, the context scheduler 3 is permanently informed by the CPU core 11—e.g. by means of a signal "current context" transmitted via a line 6—about the context or thread that is currently in a status "running", i.e. for which thread the execution pipeline or processing pipeline is just fetching and executing corresponding commands (e.g. by transmitting a context ID ("running context number") characterizing the respectively executed or running thread).

Figure 3:
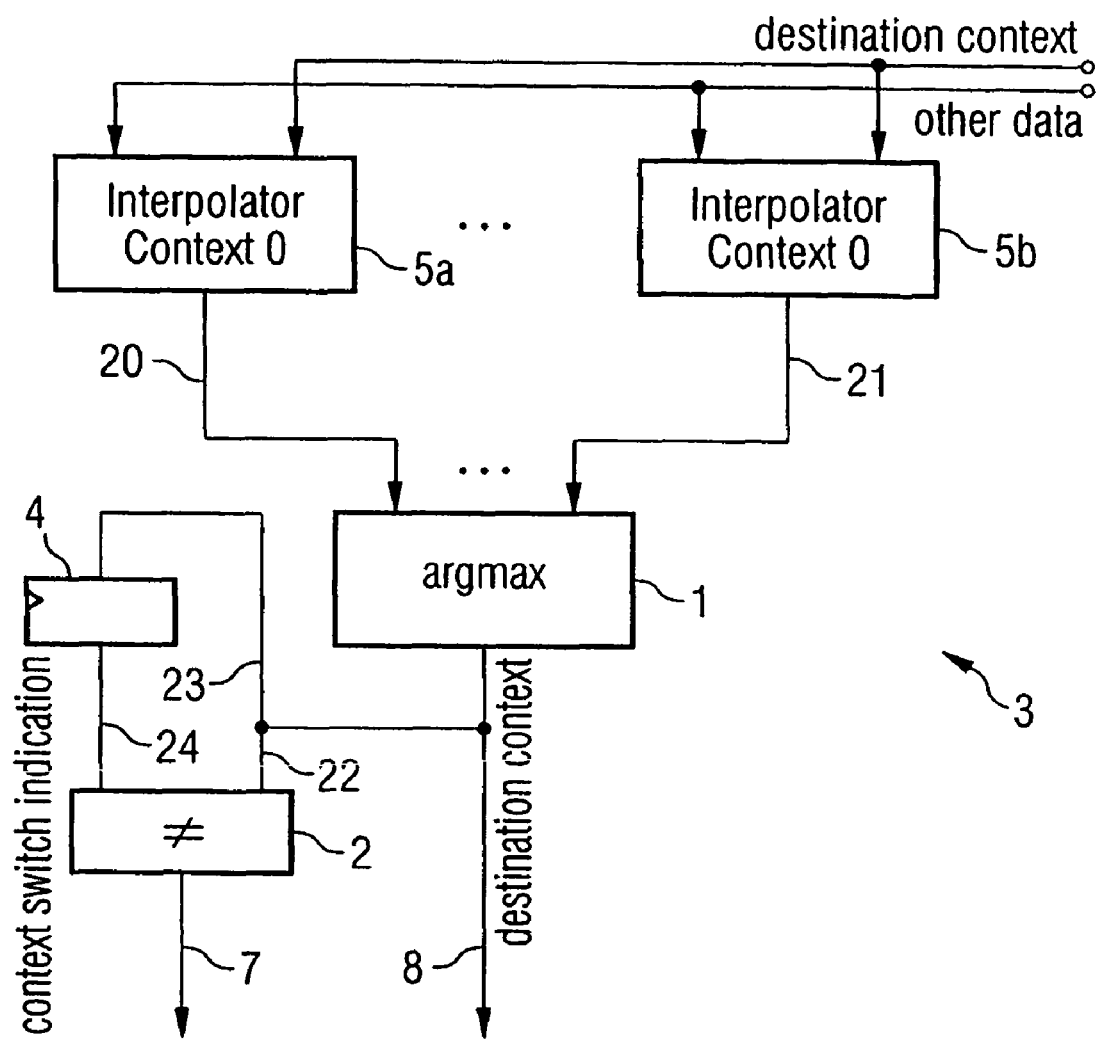
FIG. 3 a schematic detailed representation of the context scheduler illustrated in FIG. 2.

In accordance with FIG. 3, the context scheduler 3 comprises a plurality of interpolators 5a, 5b, etc. corresponding, for instance, to the number of (maximally) available contexts and respectively assigned thereto.

A first interpolator (e.g. the interpolator 5a) may, in the present embodiment, be assigned (temporarily or permanently) e.g. to a first one out of the plurality of contexts, e.g. to a currently running thread or context (being in a status "running"), and one or a plurality of further interpolators (e.g. the interpolator 5b, etc.) may be assigned (temporarily or permanently) e.g. to one or a plurality of further threads or contexts, e.g. to threads or contexts that are currently ready, but not running (that are in particular in a status "idle"), etc.

As will be explained in more detail in the following, in the present embodiment the respective interpolator (e.g. the interpolator 5a) assigned to the currently running thread or context (being in a status "running") (and possibly additionally also interpolators that have been assigned to currently newly loaded thread during the above-mentioned thread scheduling) is/are taken to an "activated" status (status "interpolator running"), and the interpolator(s) (e.g. the interpolator 5b) of the remaining—currently ready, but not running—threads or contexts is/are taken to a "deactivated" status (status "interpolator idle").

In the activated status—as will also be explained in more detail further below—the corresponding interpolator 5a calculates a respectively new, updated, modified thread index value, and the respectively (newly) calculated index value is transmitted to a comparing device 1 by means of a corresponding signal output at a line 20.

In contrast to this, the respectively deactivated interpolators 5b (continue to) output—without modification—the respectively last calculated thread index value which is also supplied to the comparing device 1 by means of corresponding signals transmitted via corresponding lines 21.

The comparing device 1 determines which interpolator 5a, 5b supplies the respectively greatest thread index value (i.e. for which thread or context the respectively greatest thread index value exists).

As results from FIG. 3, the comparing device 1 provides at a line 8 a signal "destination context" characterizing the thread or context with the respectively greatest thread index value (e.g. a signal containing the context ID of the thread or context with the respectively greatest thread index value).

In accordance with FIG. 2, the signal "destination context" output by the comparing device 1 at the line 8 is transmitted to the CPU core 11, and—as is shown in FIG. 3—via a line 22 to a first input of a comparator 2, and via a line 23 to a latch 4.

The latch 4 transmits the signal "destination context" present at the line 23 and indicating the context ID of the thread with the respectively greatest thread index value with a certain delay via a line 24 to a second input of the comparator 2.

If there is a change with the thread or context with the respectively greatest thread index value—and thus also a change with the signal "destination context" indicating the context ID of the thread with the respectively greatest thread index value—there is—temporarily—a signal "destination context $_{new}$" characterizing the new context ID already present at the lines 8, 22, 23, but—due to the above-mentioned delay effect of the latch 4—there is still a signal "destination context $_{old}$" characterizing the old context ID present at the line 24.

Due to the—temporary—difference of the signals applied to the first and second inputs of the comparator 2 via the line 22 and the line 24, the comparator 2 will—temporarily—output a signal "context switch indication" at a line 7, characterizing a change that has occurred with the thread or context with the respectively greatest thread index value, which—as results from FIG. 2—will be transmitted to the CPU core 11.

The CPU core 11 may then perform a corresponding context change, wherein the context indicated by the signal "destination context" output at the lines 8 is then taken to a running status (status "running"), and the last running context or the context being in a status "running", respectively, is taken to a non-running status (in particular e.g. to a status "idle").

As has already been explained briefly above, the interpolator (e.g. the interpolator 5a), in particular the respective interpolator assigned to the currently running thread or context (being in a status "running") is taken to an activated status.

Figure 4:
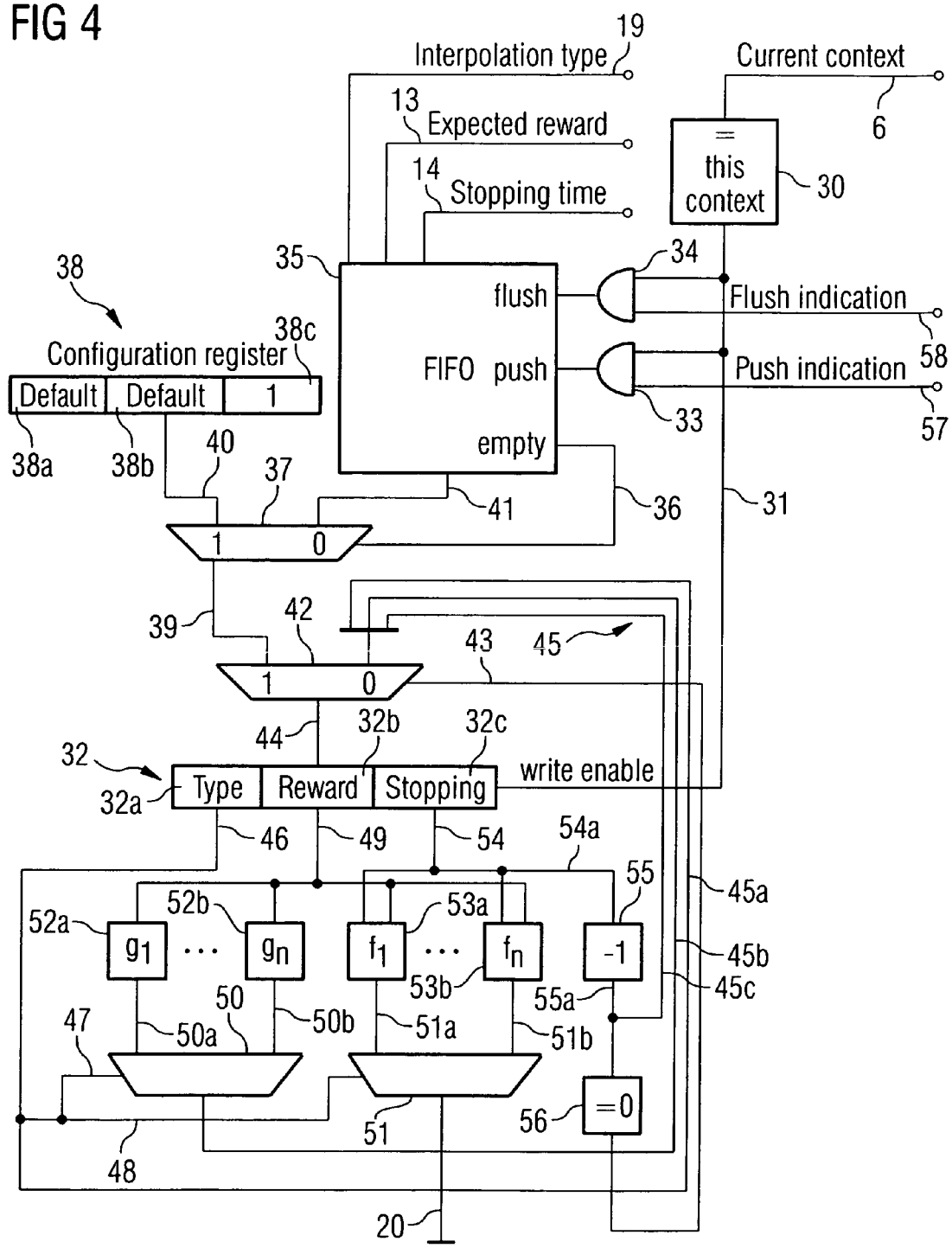
FIG. 4 a schematic detailed representation of one of the interpolators used in the context scheduler illustrated in FIG. 3.

To this end—as results from FIG. 4—in each interpolator 5a the context ID transmitted by the CPU core 11 at the line 6 by means of the signal "current context" and characterizing the respectively executed or running thread is compared, in a comparing device 30, with the context ID—that is e.g. stored in the comparing device 30—of the context assigned to the respective interpolator 5a.

If the context ID characterizing the respectively executed or running thread is identical to the context ID of the context assigned to the respective interpolator 5a, the comparing device 30 outputs an activate or enable signal, in particular a signal "write enable", at a line 31.

The signal "write enable" is transmitted to an enable input of a register set 32 and to respective first inputs of corresponding AND elements 33, 34.

By this—as will be explained in more detail in the following—the register set 32 is enabled to be (newly) written with appropriate values, and the AND elements 33, 34 are enabled to transmit corresponding signals "flush indication" or "push indication" present at the lines 57, 58 to corresponding control inputs of a FIFO memory 35 (FIFO=First-In-First-Out).

As results from FIG. 2, and as will be explained in more detail in the following, the CPU core 11 provides, via corresponding lines 13, 14, 19 that are connected with the context scheduler 3, signals "interpolation type", "expected reward", and "stopping time" relating to the respectively running thread or context (or—for the respectively running thread or context—corresponding variable values for corresponding variables characterizing the respective interpolation type, the expected reward, and the stopping time (cf. below)).

As will be explained in more detail below, the corresponding "interpolation type", "expected reward", and "stopping time" variable values are loaded into the FIFO memory 35 that is assigned to the respectively running thread or context.

As long as no corresponding variable values have been stored in the FIFO memory 35, i.e. as long as the FIFO memory 35 is an "empty" status, a signal "empty" characterizing the "empty" status of the FIFO memory 35 is output at a line 36.

The line 36 is connected with a control input of a first multiplexer 37.

The signal "empty" supplied to the control input of the first multiplexer 37 at the line 36 results in that corresponding output lines 39 of the first multiplexer 37 are logically connected with corresponding input lines 40 that are connected to a default register set 38, and that the output lines 39 of the first multiplexer 37 are logically disconnected from corresponding input lines 41 that are connected with the FIFO memory 35.

Consequently, default values for the above-mentioned variables "interpolation type", "expected reward", and "stopping time" stored in the default register set 38 (in particular variable values stored in an interpolation type default register 38a, an expected reward default register 38b, and a stopping time default register 38) are transmitted to the multiplexer output lines 39 via the multiplexer input lines 40 and the first multiplexer 37.

As interpolation type default values and expected reward default values, e.g. the values that are assigned to the respective context or thread and that are stored in the above-mentioned context status array memory may be stored in the corresponding registers 38a, 38b. Furthermore, e.g. the value "1" may—definitely—be stored as stopping time default value in the corresponding register 38c.

As results from the above explanations and the representation according to FIG. 4, a signal "stopping time=0" is first of all present at a line 43 that is connected with a control input of a second multiplexer 42, said signal resulting in that corresponding output lines 44 of the second multiplexer 42 are logically connected with the above-mentioned output lines 39 of the first multiplexer 37, and that the output lines 44 of the second multiplexer 42 are logically disconnected from further lines 45—that will be explained in more detail in the following.

The consequence of this is that the above-mentioned default values for the above-mentioned variables "interpolation type", "expected reward", and "stopping time" that are stored in the default register set 38 and that are present at the lines 39 are output at the output lines 44 of the second multiplexer 42 and are written into the register set 32 (in particular the value of the variable "default interpolation type" stored in the interpolation type default register 38a into a first register 32a, the value of the variable "default expected reward" stored in the expected reward default register 38b into a second register 32b, and the value of the variable "default stopping time" stored in the stopping time default register 38c into a third register 32c).

As results further from FIG. 4, a signal representing the (interpolation type) value written into the register 32a is supplied to a control input of a third multiplexer 50 via a line 46 and a line 47, and—also via the line 46 and a line 48—to a control input of a fourth multiplexer 51.

Furthermore—as also results from FIG. 4—the signal representing the (interpolation type) value written into the register 32a and present at the line 46 is supplied to the second multiplexer 42 via a first line 45a of the above-mentioned lines 45.

A signal representing the (expected reward) value written into the register 32b is supplied, via a line 49, to respectively corresponding inputs of corresponding expected reward variable post calculators 52a, 52b, and to respectively corresponding first inputs of corresponding thread index calculators 53a, 53b.

Furthermore, a signal representing the (stopping time) value written into the register 32c is supplied to respectively corresponding second inputs of the corresponding thread index calculators 53a, 53b via a line 54, and—via a line 54a—to an input of a stopping time decrementor 55.

Each of the thread index calculators 53a, 53b calculates, by means of appropriate methods—in particular e.g. by means of appropriate, conventional Gittin's index calculating methods—, and based on the expected reward value and stopping time value stored in the register 32b or 32c, respectively, the respectively current thread index value that is to be assigned to the respective thread or context and to be output at the line 20.

By means of the signal representing the (interpolation type) value and being present at the lines 46, 48 and being supplied to the control input of the fourth multiplexer 51, it may be selected which of the thread index values calculated by the different thread index calculators 53a, 53b—each calculated on the basis of different methods and output at different lines 51a, 51b—is to be transmitted to the line 20.

As results further from FIG. 4, each of the expected reward variable post calculators 52a, 52b calculates—consistent with the respective thread index values calculated by the thread index calculators 53a, 53b on the basis of appropriate interpolation methods—by means of appropriate methods (in particular e.g. by means of appropriate methods applied with conventional Gittin's index calculating methods), and based on the expected reward value stored in the register 32b, respectively corresponding, adapted values for the above-mentioned expected reward variable.

By means of the signal representing the (interpolation type) value and being present at the lines 46, 47 and being supplied to the control input of the third multiplexer 50, it may be selected which of the adapted expected reward variable values calculated by the different expected reward variable post calculators 52a, 52b on the basis of different methods and output at different lines 50a, 50b, is to be transmitted to a second line 45b of the above-mentioned lines 45, i.e. to the second multiplexer 42.

By means of the stopping time decrementor 55, the respective (stopping time) value supplied thereto via the line 54a is decremented (in particular in that the value "1" is subtracted from the stopping time value), and a signal representing the decremented stopping time value is transmitted to a comparing device 56 via a line 55a, and via a third line 45c of the above-mentioned lines 45 to the second multiplexer 42.

As soon as—as explained above—the corresponding "interpolation type", "expected reward" and "stopping time" variable values have been loaded, via the lines 13, 14, 19, into the FIFO memory 35 assigned to the respectively running thread or context, i.e. the FIFO memory 35 is no longer in an "empty" status, no more signal "empty" is output at the line 36.

Consequently, the above-mentioned output lines 39 of the first multiplexer 37 are then logically connected with the corresponding input lines 41 that are connected with the FIFO memory 35 (and are logically disconnected from the input lines 40 that are connected with the default register set 38).

Due to the thitherto unchanged status of the signal that is present at the control input of the second multiplexer 42, the output lines 44 of the second multiplexer 42 remain logically connected with the above-mentioned output lines 39 of the first multiplexer 37, and the output lines 44 of the second multiplexer 42 remain logically disconnected from the above-mentioned further lines 45.

Consequently, the above-mentioned values for the above-mentioned variables "interpolation type", "expected reward", and "stopping time" that are stored in the FIFO memory and supplied by the CPU core 11 are transmitted via the multiplexers 37, 42 to the output lines 44 of the second multiplexer 42, and are—newly—written into the register set 32 (in particular the interpolation type value stored in the FIFO memory 35 into the first register 32a, the expected reward value stored in the FIFO memory 35 into the second register 32b, and the stopping time value stored in the FIFO memory 35 into the third register 32c).

On the basis of the changed expected reward and stopping time values stored in the registers 32b or 32c, respectively, the above-mentioned thread index calculators 53a, 53b calculate correspondingly changed, updated thread index values, and one of these values is—corresponding to the selection made via the fourth multiplexer 51—output at the line 20 as a changed thread index value that is to be assigned to the respective thread or context.

Correspondingly similar, the expected reward variable post calculators 52a, 52b calculate, on the basis of the changed expected reward value stored in the register 32b, correspondingly changed, adapted expected reward variable values, and one of these values is—corresponding to the selection made via the third multiplexer 50—supplied to the second multiplexer 42 via the line 45b.

Due to the above-mentioned change of the value of the stopping time variable stored in the register 32c (in particular since this is no longer corresponding to the above-mentioned stopping time default value=1, or, after an effected decrementing=0), there is—first of all—no more signal "stopping time=0" present at the line 43 that is connected with the control input of the second multiplexer 42. Consequently, corresponding output lines 44 of the second multiplexer 42 are no longer logically connected with the above-mentioned output lines 39 of the first multiplexer 37, but with the above-mentioned lines 45.

Consequently, the variable value that is present at the above-mentioned line 45c—and that is correspondingly decremented by the stopping time decrementor 55 vis-à-vis the stopping time variable value present at the line 54a and stored in the third register 32c—is supplied via the second multiplexer 42 to the third register 32c and is stored there.

Correspondingly similar, the adapted expected reward variable value that is present at the above-mentioned line 45b and that is supplied by the expected reward variable post calculator 52a, 52b selected by the third multiplexer 50, is supplied via the second multiplexer 42 to the second register 32b and is stored there, and the value of the "interpolation type" variable is supplied (back) via the multiplexer 42 to the first register 32a and is (again) stored there.

Due to the—again—changed expected reward and stopping time values stored in the registers 32b or 32c, respectively, the above-mentioned thread index calculators 53a, 53b again calculate correspondingly changed, updated thread index values, and one of these values is—corresponding to the selection made via the fourth multiplexer 51—output at the line 20 as changed thread index value that is to be assigned to the respective thread or context.

Correspondingly similar, correspondingly changed, adapted expected reward variable values are—again—calculated by the expected reward variable post calculators 52a, 52b on the basis of the newly changed expected reward value stored in the register 32b, and so on.

In so doing—as results from FIG. 4—the stopping time decrementor 55 continues to decrement the (stopping time) value that is respectively supplied thereto via the line 54a (in particular in that the value "1" is subtracted from the last valid stopping time value), until the comparing device 56 determines that the stopping time value has reached the value Zero.

Subsequently, the comparing device 56 (again) applies a signal "stopping time=0" at the line 43 that is connected with the control input of the second multiplexer 42, which results in that the output lines 44 of the second multiplexer 42 are (again) logically connected with the above-mentioned output lines 39 of the first multiplexer 37, and that the output lines 44 of the second multiplexer 42 are (again) logically disconnected from the lines 45.

Consequently, the above-mentioned values for the above-mentioned variables "interpolation type", "expected reward", and "stopping time" which are stored (or newly stored, respectively) in the FIFO memory and are (possibly newly) supplied by the CPU core 11, can be transmitted via the first multiplexer 37 and the second multiplexer 42 to the register set 32, and can be stored in the corresponding registers 32a, 32b, 32c.

The above-mentioned variable "expected reward" represents—corresponding to the theory of the Gittin's indices (known from "multi-armed bandit problem")—the quality of the success achieved by the execution of the respective thread, e.g. the size of the memory space cleared after the execution of the thread (i.e. the respective size to be optimized), and the above-mentioned variable "stopping time" represents a (weighting) parameter resulting from the theory of the Gittin's indices.

For the loading of corresponding values for the above-mentioned variables "interpolation type", "expected reward", and "stopping time" into the FIFO memory 35, the CPU core 11 may—as is illustrated in FIGS. 2 and 4—output the above-mentioned signal "push indication" at the line 57 (whereupon the corresponding variable values that are present at the lines 13, 14, 19 are stored in the FIFO memory 35).

If "jumps" have to be performed—e.g. on occurrence of an error in the CPU core 11—the values for the above-mentioned variables "interpolation type", "expected reward", and "stopping time" that have hitherto been stored in the FIFO memory 35 may, by means of a signal "flush indication" that is output at the line 58 by the CPU core 11, be (completely) erased again, whereupon, by means of a signal "push indication" that is output at the line 57, corresponding values for the variables "interpolation type", "expected reward", and "stopping time" can again—corresponding to the signals then present at the lines 13, 14, 19—be stored in the FIFO memory 35. The above-mentioned thread index values correspond to values which are used for the optimization of the respective cost function and which are calculated in correspondence with the "multi-armed bandit theory" (wherein—as indicated above—a thread switching without a loss of cycles is postulated for the solution of the optimization problem). If this condition is—slightly—violated, values that are correspondingly deviating—in most cases slightly—from an optimal solution will result.

What is claimed is:

1. A context scheduling method, the method comprising:
   scheduling threads to be executed by a multithreaded (MT) processor, wherein the scheduling is performed as a function of index variables assigned to the threads;
   calculating a new index value for an index variable associated with a first thread using an interpolator;
   changing the index variable associated with the first thread to the new index value during execution of the first thread;
   comparing the new index value with at least one other index value associated with at least one other thread;
   determining a resultant index value based on the comparing; and
   switching execution of the processor to a thread associated with the resultant index value if the thread associated with the resultant index value is different from the first thread.

2. The scheduling method according to claim 1, wherein a thread whose index variable has a highest value based on the comparing is selected as a thread to be executed by the processor.

3. The scheduling method according to claim 1, wherein a thread whose index variable has a lowest value based on the comparing is selected as a thread to be executed by the processor.

4. The scheduling method according to claim 2, wherein execution of the selected thread by the processor is interrupted if the index variable of the selected thread no longer has the highest value or a lowest value.

5. The scheduling method according to claim 4, wherein, instead of the selected thread whose execution was interrupted, a new thread is selected as the thread to be executed by the processor, wherein the new thread comprises an index variable having a highest or lowest value.

6. The scheduling method according to claim 1, wherein the first thread comprises an active status during the changing.

7. The scheduling method according to claim 1, wherein the interpolator comprises a hardware circuit.

8. The scheduling method according to claim 1, wherein the index variable associated with the first thread comprises an expected reward variable representing a quality of success achieved by execution of the first thread.

9. The scheduling method according to claim 1, wherein the index variable associated with the first thread comprises a stopping time variable representing a stopping time of the first thread.

10. The scheduling method according to claim 1, wherein a thread change with the processor does not result in a loss of cycles.

11. A system for scheduling threads to be executed by a multithreaded (MT) processor, the system comprising:
    an interpolator for calculating new index values for the index variables assigned to the threads;
    a device for comparing index variables assigned to the threads, the device providing a resultant index variable; and
    a device for generating a thread change signal if a thread associated with the resultant index variable is different from a currently executing thread, wherein the system schedules threads as a function of the index variables assigned to the threads and switches execution to the thread associated with the resultant index value in response to the thread change signal.

12. The system according to claim 11, wherein the comparing device determines a thread whose index variable has a highest value.

13. The system according to claim 11, wherein the comparing device determines a thread whose index variable has a lowest value.

14. The system according to claim 12, wherein the thread change signal comprises a context switch indication.

15. The system according to claim 11, wherein the interpolator comprises a hardware circuit that changes a value of an index variable assigned to a thread having an active status.

16. A context scheduling circuit comprising:
a plurality of interpolators, each interpolator assigned to a context of a multithreaded (MT) processor, wherein each interpolator calculates new index variables for its assigned context;
a comparing device coupled to outputs of the plurality of interpolators, the comparing device determining a greatest new index value from the plurality of interpolators;
a latch coupled to an output of the comparing device, the latch storing a previous context value; and
a comparator comprising a first input coupled to the output of the comparing device, and a second input coupled to an output of the latch, the comparator providing a context switch indication if a context value associated with the greatest new index value is different from the previous context value.

17. The circuit of claim 16, wherein the interpolator comprises a plurality of thread index calculators and a plurality of expected reward calculators.

18. The circuit of claim 17, wherein the plurality of thread index calculators uses Gittin's index calculating methods.

19. The circuit of claim 17, further comprising:
an expected reward register having an output coupled to inputs of the plurality of expected reward calculators; and
a stopping time register having an output coupled to inputs of the plurality of thread index calculators.

20. The circuit of claim 16, further comprising the multithreaded (MT) processor, the MT processor coupled to the plurality of interpolators.

* * * * *